United States Patent [19]

Edmonds

[11] 4,439,104
[45] Mar. 27, 1984

[54] COMPRESSOR INLET GUIDE VANE AND VORTEX-DISTURBING MEMBER ASSEMBLY

[75] Inventor: David H. Edmonds, Tempe, Ariz.

[73] Assignee: The Garrett Corporation, Los Angeles, Calif.

[21] Appl. No.: 273,715

[22] Filed: Jun. 15, 1981

[51] Int. Cl.³ ............................................. F01D 17/16
[52] U.S. Cl. .................................... 415/161; 415/119; 415/DIG. 1; 181/213
[58] Field of Search ................... 415/119, 161, 121 R, 415/216, 151, DIG. 1; 181/213, 222

[56] References Cited

U.S. PATENT DOCUMENTS

| 2,171,342 | 8/1939 | McMahan . |
| 2,440,825 | 5/1948 | Jandasek ...................... 415/161 UX |
| 2,518,869 | 8/1950 | Corless . |
| 2,739,709 | 3/1956 | Kaiser . |
| 2,773,553 | 12/1956 | Heurich et al. . |
| 3,085,741 | 4/1963 | Burkhardt . |
| 3,093,299 | 6/1963 | Hammann et al. . |
| 3,221,983 | 12/1965 | Trickler et al. . |
| 3,367,273 | 2/1968 | Dodson . |
| 3,642,379 | 2/1972 | Swearingen . |
| 3,819,008 | 6/1974 | Evans et al. . |
| 3,873,231 | 3/1975 | Callahan . |

FOREIGN PATENT DOCUMENTS

| 1161481 | 1/1964 | Fed. Rep. of Germany . |
| 293236 | 9/1927 | United Kingdom . |
| 366257 | 1/1931 | United Kingdom . |
| 1120240 | 4/1967 | United Kingdom . |
| 1206307 | 11/1968 | United Kingdom . |
| 1244292 | 1/1970 | United Kingdom . |
| 1307867 | 7/1970 | United Kingdom . |
| 1432262 | 2/1973 | United Kingdom . |

Primary Examiner—Philip R. Coe
Assistant Examiner—Joseph M. Pitko
Attorney, Agent, or Firm—J. Richard Konneker; Albert J. Miller

[57] ABSTRACT

A vortex whistle silencing member is secured to the leading and trailing portions of a compressor intake articulated guide vane in such manner that the silencing member is held in a stationary position during pivotal motion of the trailing vane portion between its fully open and closed positions.

10 Claims, 7 Drawing Figures

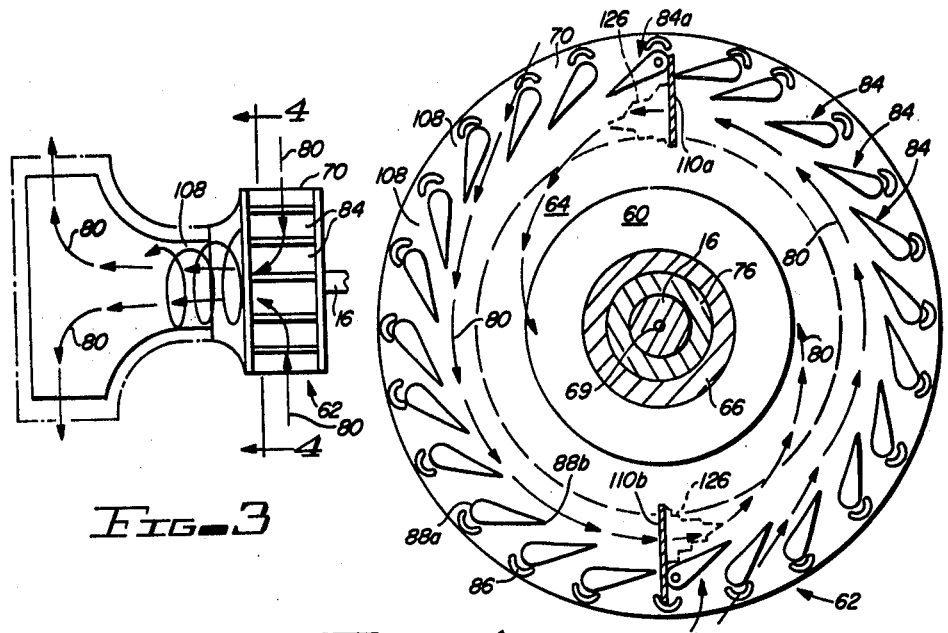
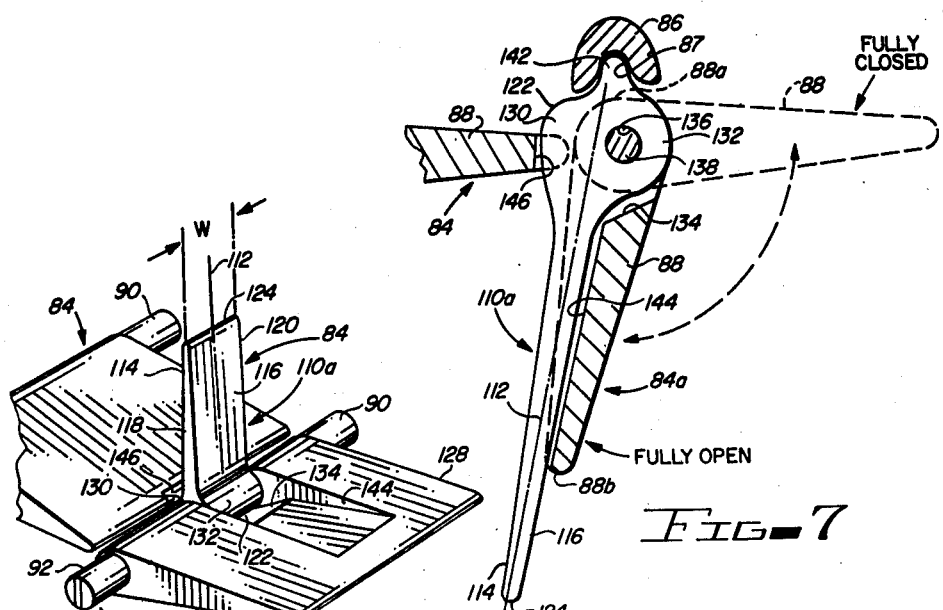

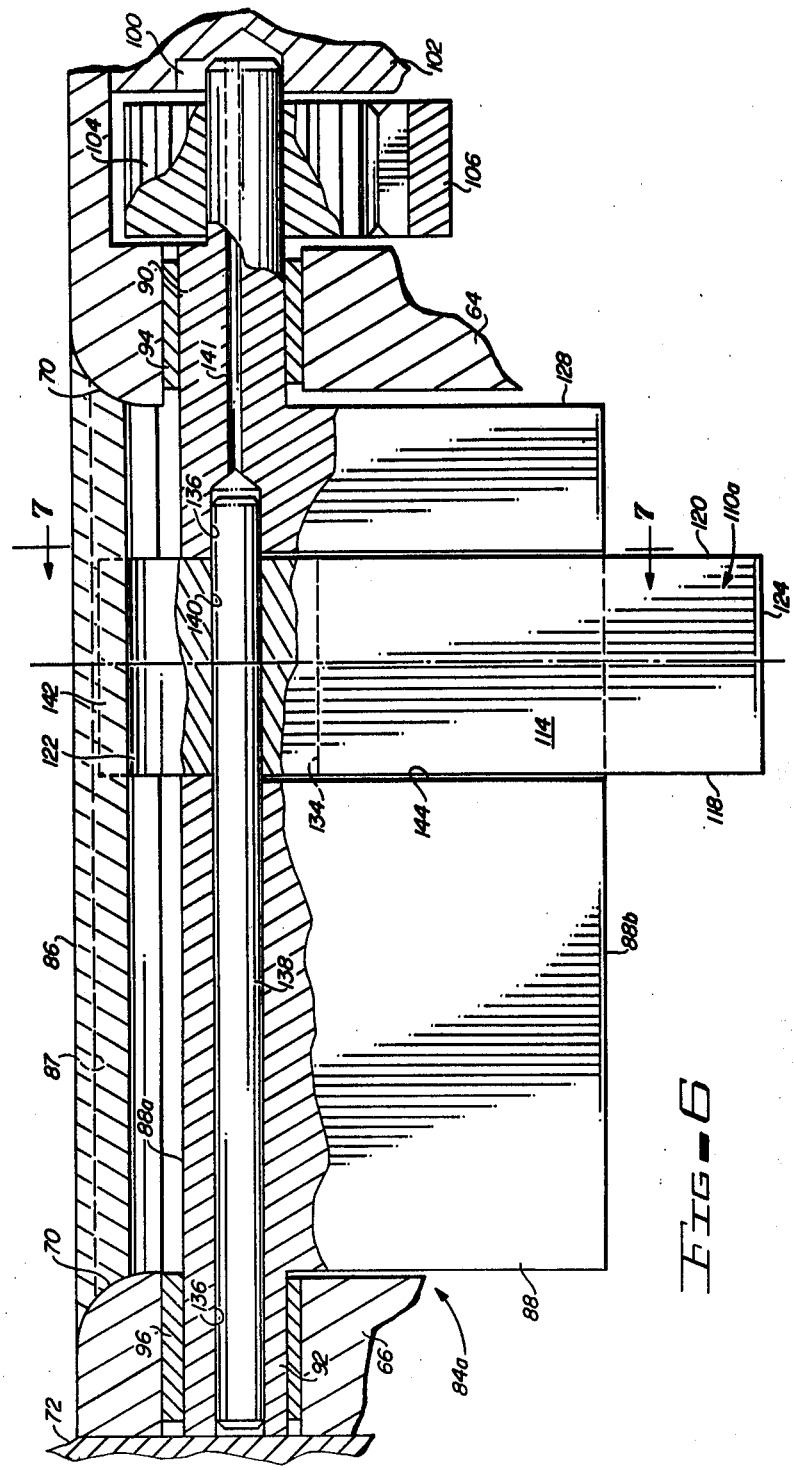

COMPRESSOR INLET GUIDE VANE AND VORTEX-DISTURBING MEMBER ASSEMBLY

CROSS-REFERENCE TO RELATED APPLICATIONS

This application discloses subject matter common to that disclosed in patent application Ser. No. 273,716 entitled "Intake Vortex Whistle Silencing Apparatus and Methods" filed concurrently herewith.

BACKGROUND OF THE INVENTION

This invention relates generally to noise-attenuating devices, and more particularly provides novel apparatus and methods for silencing vortex "whistle" noises generated within the radial-to-axial intake section of the load compressor of a gas turbine engine auxiliary power unit.

In addition to their traditional propulsion functions, gas turbine engines are also often used as auxiliary power units (APU's) to supply pneumatic power to a wide variety of accessory devices and systems. This is accomplished by bleeding a desired quantity of compressed air from a centrifugal "load" compressor which is connected to and driven by the engine's drive shaft.

Ambient air is drawn axially into the load compressor through the annular flow passage of an intake assembly which has a circular, radially outwardly facing inlet opening that circumscribes the drive shaft. Adjustable inlet guide vanes are mounted in a mutually spaced relationship around the circumference of the radial inlet opening for conjoint pivotal motion about axes parallel to the shaft axis between a fully closed position in which the vanes are each generally tangentially disposed relative to their inlet opening, and a fully open position in which each of the vanes extends generally radially inwardly therefrom. By selectively adjusting the angular position of these vanes the flow rate of air entering the load compressor (and thus the flow rate of compressed air supplied to the pneumatically-operated accessory apparatus) during engine operation may be accurately regulated.

Because of their orientation relative to the drive shaft axis, the inlet guide vanes, within a certain range of opening angles, impart to air traversing the intake assembly flow passage a desirable vortex pattern in which the air swirls about the shaft axis as it is drawn axially into the load compressor. This vortex pattern causes the air therein to contact the curved impeller blades of the centrifugal load compressor at an efficient angle of incidence.

However, in conventional radial-to-axial air intake assembles of the type described, the induced air swirl also creates (within certain ranges of air flow rates and vane opening angles) a shrill intake noise known as vortex "whistle". Vortex whistle is undesirable from two standpoints. First, it is often unacceptable under applicable acoustic standards. Secondly, generation of the whistle within the intake assembly causes a concomitant aerodynamic energy loss which diminishes the efficiency of the load compressor.

Accordingly, it is an object of the present invention to provide apparatus and methods for eliminating or minimizing intake vortex whistle in gas-utilizing devices such as the described load compressor.

SUMMARY OF THE INVENTION

In its broadest sense, the present invention obviates the vortex whistle problem by introducing into the swirling air pattern traversing the intake assembly at least one relatively small zone of random turbulence. Such turbulence eliminates the vortex whistle, and the load compressor efficiency loss associated therewith, without significantly disrupting the overall vortex air pattern within the intake assembly.

In a preferred embodiment of the present invention, which is incorporated into a gas turbine engine APU, the means for silencing the load compressor intake whistle comprise a pair of relatively small vortex-disturbing members, and means for securing the members to the intake assembly in a diametrically opposed relationship in which each of the members extends generally radially into the intake assembly, adjacent its radially facing inlet opening, in the path of the incoming air. Each of the vortex-disturbing members intercepts an axially extending portion of the incoming air, creating in the swirling intake air pattern near its origin two diametrically opposed zones of random turbulence which attenuate vortex whistle, leaving only acceptable air inrush noise in the load compressor intake assembly.

The adjustable inlet guide vanes positioned in a mutually spaced array around the circumference of the radial intake opening are each of an articulated construction, having a stationary leading edge portion and a pivotable trailing body portion. According to a feature of the invention, the means for securing the vortex-disturbing members to the intake assembly comprise means for connecting each member to both the leading and trailing portions of a different one of a diametrically opposite pair of guide vanes in such manner that the vortex-disturbing members are held firmly in their radially extending positions without hindering pivotal motion, between fully open and closed positions, of the trailing portions of the guide vanes to which they are connected.

BRIEF DESCRIPTION OF THE DRAWINGS

FIG. 3 is a slightly enlarged schematic representation of the load compressor and intake assembly portion of FIG. 1 illustrating the air flow therethrough;

FIG. 4 is an enlarged cross-sectional view through the inlet guide vane portion of the intake assembly taken along line 4—4 of FIG. 3;

FIG. 5 is an enlarged perspective view of an adjacent pair of the inlet guide vanes depicted in FIG. 4, and illustrates a vortex-disturbing tab of the present invention which is connected to one of the vanes;

FIG. 6 is a greatly enlarged side elevational view, with portions broken away for clarity, of the vane and tab assembly of FIG. 5, with the vane pivoted into engagement with the tab; and FIG. 7 is a reduced scale cross-sectional view through the vane and tab assembly taken along line 7—7 of FIG. 6, and additionally illustrates a portion of an adjacent vane.

DETAILED DESCRIPTION

Figure 1:
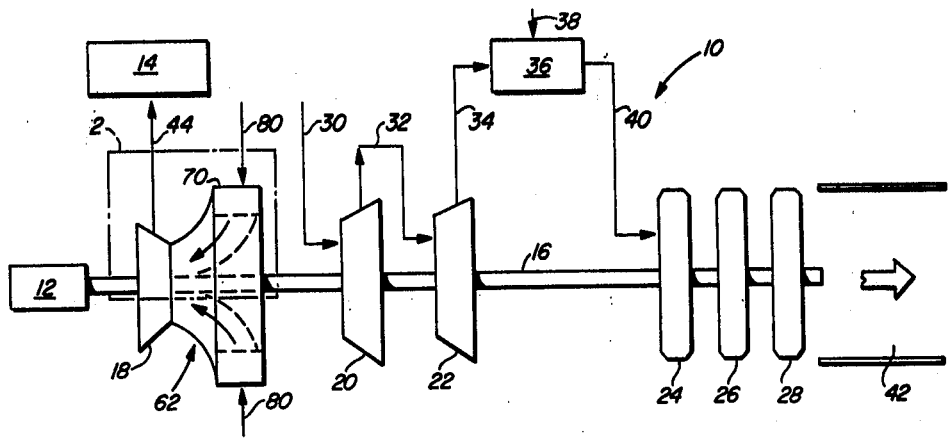
FIG. 1 is a schematic diagram of a gas turbine engine auxiliary power unit (APU) having a load compressor intake assembly in which is incorporated vortex whistle silencing apparatus embodying principles of the present invention.

A gas turbine engine auxiliary power unit (APU) 10 is schematically illustrated in FIG. 1 and constitutes a preferred embodiment of the present invention. Auxiliary power units such as APU 10 are typically used to provide mechanical power to a driven accessory such as a generator 12, and to simultaneously supply compressed air to an accessory system such as an aircraft environmental control system 14 or to other pneumatically-operated devices such as air turbine motors and the like.

APU 10 includes a power shaft 16 drivingly coupled as its left end (through a gearboxx not shown in FIG. 1) to the generator 12. Fixedly mounted on shaft 16 for rotation therewith are, from left to right along its length, a centrifugal load compressor 18, first and second stage centrifugal power compressor 20, 22, and first, second and third stage axial power turbines 24, 26 and 28, positioned at the right end of shaft 16.

During operation of the APU, ambient air 30 is drawn into the inlet of the first stage power compressor 20, compressed, and then discharged through a duct 32 into the inlet of the second stage power compressor 22 where it is further compressed. Compressor 22 discharges the further compressed air through a duct 34 into a combustor 36. The compressed air entering combustor 36 is mixed with fuel 38 also supplied to the combustor to form a fuel-air mixture which is continuously burned therein. Expanded gas 40 exiting the combustor is forced axially through the power turbines 24, 26, 28 to supply rotational power to the shaft 16 and is exhausted from the APU to atmosphere through a discharge passage 42 positioned immediately downstream of the power turbines. The rotation of the shaft 16 drives the generator 12 (or other mechanically-driven accessories) and also rotationally drives the load compressor 18 which is used to supply compressed air via conduit means 44 to the pneumatically-operated accessory system 14.

Figure 2:
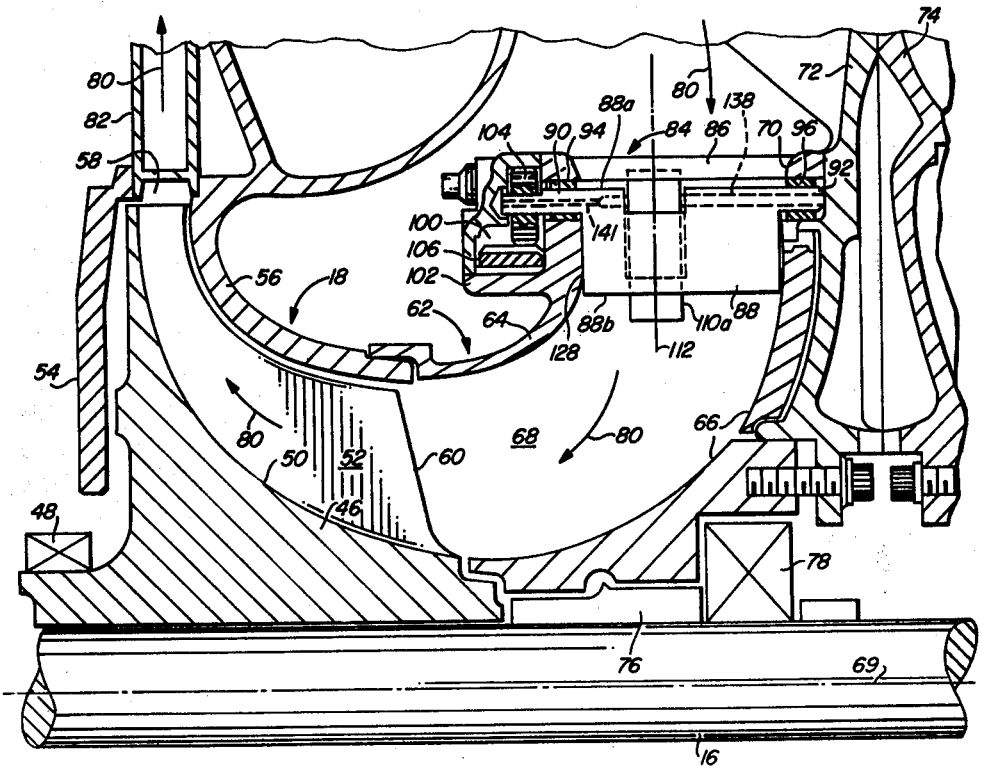
FIG. 2 is a greatly enlarged, fragmentary cross-sectional view through the load compressor portion of the APU within the phantom line envelope 2 of FIG. 1.

As can best be seen in FIG. 2, the load compressor 18 includes a centrifugal hub portion 46 which circumscribes and is fixed to the shaft 16, and is rotatably supported around its left end by bearing means 48. Secured to the hub 46 around its concavely curved periphery 50 are a series of curved impeller blades 52. Hub 46 and blades 52 are enclosed within shroud means having a first wall portion 54 adjacent the left end of hub 46, and a second wall portion 56 spaced axially inwardly of wall 54 and defining therewith a circumferentially extending shroud outlet passage 58 at the radially outermost ends of the impeller blades 52. Shroud wall 56 defines with the hub periphery 50 an axially facing annular inlet 60 of the load compressor 18.

Secured to the load compressor 18 around its inlet 60 is an intake assembly 62 having a hollow, generally bell-shaped body defined by mutually spaced curved wall sections 64, 66 which circumscribe the shaft 16 and in turn define a curved, annular gas flow passage 68 extending through the intake body and communicating at its left or discharge end with the annular load compressor inlet 60. The axis 69 of shaft 16 defines the longitudinal axis of such flow passage.

Wall 64 is sealed at its inner end around the shroud wall 56 adjacent compressor inlet opening 60, and wall 66 is sealed at its inner end around the hub 46 adjacent inlet opening 60. From their connections to the load compressor 18, walls 64, 66 flare rightwardly and radially outwardly, defining at their outer ends a circular, radially outwardly facing inlet opening 70 which communicates with the intake assembly flow passage 68. Intake wall 66 is secured to an annular mounting plate 72 which is in turn secured to a portion 74 of the housing structure of the first stage power compressor 20. Bearing means 76, 78 are secured around a central portion of the intake wall section 66 and rotatably support the shaft 16.

During operation of the APU 10, ambient air 80 is drawn into the radially outwardly facing, circular inlet opening 70 of the intake assembly 62 around its entire periphery, traverses the curved, radial-to-axial intake flow passage 68, axially enters the annular load compressor inlet 60 and is radially discharged by the impeller blades 52 into the annular shroud outlet passage 58. The discharged air then flows into an annular diffuser section 82 circumscribing the passage 58. From the diffuser section the air 80 is discharged into the supply conduit means 44 (FIG. 1) for delivery to the accessory system 14.

To regulate the quantity of air delivered to the accessory system 14 from the load compressor 18, a series of adjustable inlet guide vanes 84 are incorporated into the intake assembly 62. Referring now to FIGS. 2 and 4, the vanes 84 are positioned in a circumferentially spaced array around the inlet opening 70 of the intake assembly 62. Each of the vanes is of an articulated construction, having an elongated stationary leading edge portion 86 with a generally C-shaped cross-section defining a longitudinally extending channel 87 therein (FIG. 7), and a movable trailing body portion 88 having an elongated rectangular side elevational shape (i.e., as viewed in FIG. 2). Each of the trailing body portions has a relatively wide, curved front edge portion 88a and tapers generally uniformly therefrom to a relatively narrow rear edge portion 88b.

Leading edge portions 86 extend lengthwise between and are secured at their opposite end to the spaced apart intake walls 64, 66 at the inlet opening 70, with the channels 87 facing radially inwardly. Trailing body portions 88 extend lengthwise across substantially the entire width of flow passage 68 and are mounted radially inwardly of the leading edge portions 86 by means of cylindrical pin portions 90, 92 (FIG. 2) extending outwardly from the opposite ends of each trailing vane body adjacent its front edge 88a. Pins 90, 92 are rotatably received in bearings 94, 96 respectively carried by the intake wall sections 64, 66. This permits pivotal motion of the trailing vane bodies, about axes parallel to the axis 69 of shaft 16, between a fully open position in which the trailing bodies extend generally radially into the flow passage 68 (i.e., at a zero degree vane angle), and a fully closed position in which they are generally tangentially disposed relative to the outer circumference of the intake assembly (i.e., at a vane angle of approximately 90°).

The vane pins 90 extend into an annular chamber 100 formed within a circumferentially extending, axially enlarged portion 102 of intake wall section 64. Within the chamber 100 are a series of small circular spur gears 104, each of which is keyed to one of the pins 90. Each of the gears 104 engages a ring gear 106 which is also located within the chamber 100. The trailing vane bodies 88 are conjointly pivoted, to thereby open and close the small openings 108 (FIG. 4) between adjacent pairs of the guide vanes, in a conventional manner by rotating (by means not shown) one of spur gears 104. This rotation rotationally drives the ring gear 106, thereby simultaneously rotating all of the other spur gears 104 and the trailing guide vane bodies to which they are secured.

The use of the guide vanes 84 in the described orientation permits the indicated compact structural arrangement of the APU in which the load compressor 18 is positioned directly adjacent the power compressor 20. Additionally, because of such orientation, air entering the intake assembly inlet opening 70 has imparted thereto a vortex air pattern 108 (FIG. 3) in which the entering air is caused to swirl about the shaft axis 98 as it inwardly traverses the intake flow passage 68. This swirling air pattern, two individual streams of which are indicated by the dashed, arrowed lines 80 in FIG. 4, causes the incoming air to initially interact with the impeller blades 52 at an efficient angle of incidence.

However, at certain inlet guide vane opening angles (between approximately 55° and 75° in the illustrated intake assembly), which correspond to the vortex (or "swirl") angle, a heretofore unsolved problem within the intake assembly—vortex whistle. Such vortex whistle, commonly referred to as the "Hilsch tube" effect, is a very high pitched acoustic sound which is undesirable not only from a noise standpoint, but also because it generates an aerodynamic energy loss within the intake assembly which reduces the overall efficiency of the load compressor. As will now be described, the present invention solves the vortex whistle problem by creating in the vortex air pattern, near its origin, two relatively small zones of random turbulence which simultaneously silence the whistle and substantially reduce the load compressor efficiency loss previously associated therewith.

Attenuation of the Vortex Whistle

Referring now to FIGS. 4, 5 and 6, the present invention achieves the desired attenuation of the vortex whistle by the unique use of two relatively small vortex-disturbing tabs or baffle members 110a, 110b. Each of the tabs has a relatively thin, generally elongated rectangular shape, a longitudinal axis 112, a width W substantially smaller than the length of each trailing vane body 88 (the "length" of the vane body 88, as viewed in FIG. 5, being the length of is rightmost edge), a pair of opposite side surfaces 114, 116, a pair of side edges 118, 120, a leading end 122, and a trailing end 124. In a novel manner described below, the tabs 110a, 110b are respectively mounted on a diametrically opposite pair of guide vanes 84a, 84b (FIG. 4). The diametrically oppositely mounted tabs each extend lengthwise in a generally radially inward direction into the intake flow passage 68 (see FIG. 2), with the width W of the tab extending parallel to the shaft axis 69. By means subsequently set forth, the tabs are locked in their radially inwardly extending positions, yet permit unimpeded pivotal motion of the trailing body portions of the guide vanes to which they are connected. As best illustrated in FIG. 7, each tab extends somewhat radially inwardly of the guide vane to which it is connected (i.e., guide vane 84a in FIG. 7) when the trailing body portion of such vane is in its fully open (i.e., radially inwardly extending) position.

The guide vanes 84 depicted in FIG. 4 are shown in a relatively closed position in which the air 80 entering the intake assembly through the vane openings 108 is caused to swirl about the shaft axis 69 thereby creating the vortex air pattern 108 shown in FIG. 3. As indicated in FIG. 4, a side surface of each of the tabs 110a, 110b intercepts a portion of this incoming, swirling air 80 and creates therein relatively small wakes or random zones of turbulence 126 immediately downstream of the tab. By the creation of these small turbulence zones adjacent the origination of the vortex air pattern 108, the objectionable vortex whistle is substantially silenced, leaving only an acceptable air inrush noise within the intake assembly. Because the tabs, and the turbulences which they create, are relatively small, such attenuation is effected without significantly disrupting the overall vortex air pattern and adversely altering the angle of incidence between the incoming air and the impeller blades of the load compressor.

The dimensional and positional relationships between the vortex disturbing tabs and the rest of the intake assembly are important factors in obtaining optimum whistle attenuation with minimum overall vortex disruption in the illustrated embodiment of the invention, and will now be described with reference to FIGS. 2 and 5.

Each of the tabs has a "radial immersion factor" of approximately 0.40. Stated more specifically, measured from the radial periphery of inlet opening 70, each tab projects radially into the flow passage 68 (FIG. 2) a distance equal to approximately 40 percent of the total distance from such periphery to the inner surface of intake wall section 66 along the tab axis 112. Additionally, the ratio of the tab width W (FIG. 5) to the length of the trailing vane body 88 is approximately 0.25. Finally, as can best be seen in FIG. 2, tab 110a (like tab 110b) is not centered relative to the length of the guide vane 84 to which it is connected. Rather, it is offset leftwardly (i.e., toward the vane end 128 facing intake wall section 64) so that the distance between the vane body end 128 and the tab axis 112 is approximately one-third of the vane body length.

These dimensional and positional characteristics of the tabs 110a, 110b function to similarly shape and position the two small areas 126 of random vortex turbulence. Thus, the diametrically opposed turbulence areas 126 are adjacent the inlet opening 70, extend axially only a portion of the distance between the intake walls 64, 66 adjacent such opening, are axially offset toward the axially inner wall section 64, and extend radially inwardly from the inlet opening 70 only a portion of the radial distance from the opening to the axially outer wall section 66.

Connection of the Tabs to the Vane

An important feature of the present invention resides in the technique used to secure the tabs 110a, 110b to the inlet guide vanes 84a, 84b. Generally speaking, the tab-to-vane attachment method comprises, for each of the two tab and vane assemblies, connecting the tab to the trailing vane body for relative pivotal motion about the vane body pin axis, and associating the tab with the vane's stationary leading edge portion in a manner preventing such pivotal motion of the tab and locking it in its radially inwardly extending position.

FIGS. 5, 6 and 7 depict one of the tab and vane assemblies, 110a and 84a (the tab and vane assembly 110, 84b being identically constructed). It can be seen in these figures that the tab 110a is quite compactly integrated into the structure of the articulated guide vane 84a, being connected to both its stationary and movable components yet projecting only slightly laterally outwardly (leftwardly in FIG. 7) of the vane in its fully open position. Despite this compact tab mounting arrangement, the tabs in no way interfere with the pivotal motion of the vanes to which they are attached, or with the motion of adjacent vanes.

Referring now to FIG. 7, the leading end portion 122 of tab 110a is laterally enlarged along opposite sides of the tab axis 112 and is of a generally cylindrical shape, forming a leftwardly protruding section 130 and a rightwardly protruding section 132, each of which extends along the entire width of the tab's leading end portion. The rightwardly protruding section 132 is received in a notch 134 cut generally transversely through the leading end of the trailing body 88 of vane 84a. A circular bore 136 (FIG. 6) extends axially inwardly through the vane pin 92, across notch 134 and back into the vane body. The tab is pivotally secured to the trailing vane body by a mounting pin 138 which is received by bore 136 and extended through an opening 140 formed through the transversely enlarged front section 132 of the tab. The annular mounting plate 72, positioned at the entrance of bore 136, retains pin 138 in the bore 136. A smaller bore 141 is extended rightwardly from bore 136 and outwardly through vane pin 90. This smaller bore permits insertion of a small rod therein to push retaining pin 138 outwardly through the left end of the bore 136 during disassembly of the illustrated integral vane and tab structure.

Pivotal motion of the tab away from its radially inwardly extending position is precluded by means of a small rib 142 which extends upwardly (as viewed in FIG. 7) from the tab's leading end 122 and is received in the channel 87 of the stationary leading edge portion 86 of vane 84a. With the trailing body 88 of vane 84a in its fully open position, a lateral portion of the nonenlarged portion of the tab is received in a slot 144 communicating with the vane notch 134 and extending along the width of the trailing vane body 88.

The tab 110a projects slightly into the path of the trailing vane body 88 immediately to its left in FIGS. 5 and 7 as such vane body is pivoted toward its fully closed position. In order to compensate for this slight interference, and permit the leftwardly adjacent vane body 88 to pivot freely between its fully closed and fully open positions, a small notch 146, having a width slightly greater than the tab width, is formed in the trailing end of such vane body. As best indicated in FIG. 7, with this leftwardly adjacent vane body in its fully closed position, the transversely enlarged tab portion 130 extends nearly completely into the notch 146, thereby functioning to seal the notch against inward air leakage when the vanes are moved to their fully closed positions.

While the intake assembly 62 of the APU 10 represents a preferred embodiment of the present invention, a variety of modifications could be made thereto without departing from the spirit and scope of the invention. For example, instead of the two vortex-disturbing tabs illustrated and described, a single tab could be used. However, it has been found that such single tab must be significantly larger than either of the dual tabs to achieve a similar level of whistle attenuation, and creates a greater disruption of the overall vortex air pattern. Similarly, a greater number of equiangularly spaced tabs (i.e., three or more) could be used, but likewise do not perform as well as the dual tabs 110a, 110b in intake 62.

As an example of another possible modification, one piece adjustable guide vanes, and another method of attaching the tabs thereto, could be used if desired. It is also possible to utilize vortex-disturbing members having other then the plate-like configurations of tabs 110a, 110b (for example, circular rods could be used). However, it has been found that the flat side surfaces of the illustrated tabs create the optimum disturbance of the vortex pattern. Additionally, intake assembly 62 could be employed in conjunction with gas-utilizing devices other than the illustrated load compressor 18.

The foregoing detailed description is to be clearly understood as given by way of illustration and example only, the spirit and scope of this invention being limited solely by the appended claims.

What is claimed is:

1. Inlet guide vane and flow disturbing member apparatus adapted to be mounted in an inlet opening of a gas intake device, said apparatus comprising:
   (a) an articulated guide vane having a leading edge member, and a trailing body member pivotable about an axis between first and second positions;
   (b) a flow disturbing member;
   (c) means for connecting said flow disturbing member and said trailing body member for relative pivotal motion about said axis, and for positioning said flow disturbing member to intercept a portion of a gas stream flowing past said trailing body member in a direction generally perpendicular to said axis; and
   (d) cooperating means on said flow disturbing member and said leading edge member for preventing appreciable pivotal motion of said flow disturbing member about said axis.

2. The apparatus of claim 1 wherein said cooperating means (d) include an indentation formed in said leading edge member and a portion of said flow disturbing member received in said indentation.

3. The apparatus of claim 2 wherein said portion of said flow disturbing member comprises a projecting rib formed thereon, and said indentation comprises a channel extending along said leading edge member.

4. The apparatus of claim 1 wherein said connecting and positioning means (c) comprise slot means formed in said trailing body member and receiving a portion of said flow disturbing member, and pin means carried by said trailing body member, said pin means extending across said slot means and through the received portion of said flow disturbing member.

5. The apparatus of claim 1 wherein said flow disturbing member is elongated, extends lengthwise in a direction generally perpendicular to said axis, and has a generally flat side surface extending generally parallel to said axis and positioned to intercept the gas stream.

6. The apparatus of claim 1 wherein said flow disturbing member has an enlarged end portion projecting outwardly from said trailing body member, and said connecting means (c) include means for connecting said enlarged end portion to said trailing body member, and wherein said apparatus further comprises a second articulated guide vane having a pivotable trailing body member with a trailing end in which is formed a notch dimensioned to receive a portion of said enlarged end portion of said flow disturbing member to thereby seal said notch against significant gas flow therethrough.

7. For use with a gas intake device or the like having an inlet opening in which are positioned a plurality of articulated, mutually spaced inlet guide vanes each having a stationary leading portion and a pivotable trailing portion, a method of connecting to one of the guide vanes a flow disturbing member adapted to intercept and turbulate a portion of a gas stream entering the inlet opening, said method comprising the steps of:
(a) pivotally connecting the flow disturbing member to the trailing portion of one of the guide vanes; and
(b) associating the flow disturbing member with the leading portion of said one of the guide vanes to prevent appreciable pivotal motion of said flow disturbing member relative thereto.

8. The method of claim 7 wherein the flow disturbing member has an end portion, and said connecting step is performed by forming an opening through the end portion, forming first and second openings through said trailing portion of said one of the guide vanes, inserting the end portion of the flow disturbing member into said first trailing portion opening, and extending a retaining member through said second opening and said opening in the end portion of the flow disturbing member.

9. The method of claim 7 wherein said connecting step is performed by interlocking adjacent portions of the flow disturbing member and the leading portion of said one of the guide vanes.

10. The method of claim 9 wherein said interlocking is performed by forming a channel in the leading portion of said one of the guide vanes, forming a rib on the flow disturbing member, and positioning said rib in said channel.

* * * * *